United States Patent
Wang et al.

(10) Patent No.: US 9,941,966 B2
(45) Date of Patent: Apr. 10, 2018

(54) METHOD FOR INFORMATION EXCHANGE IN ACCESS NETWORK, APPARATUS, AND SYSTEM

(71) Applicant: Huawei Technologies Co., Ltd., Shenzhen, Guangdong (CN)

(72) Inventors: Wenming Wang, Wuhan (CN); Yong Luo, Munich (DE); Zhiqiang Li, Shenzhen (CN); Hongyu Li, Shenzhen (CN); Yu Xiong, Ipswich (GB); Xiangjun Lai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/147,505

(22) Filed: May 5, 2016

(65) Prior Publication Data

US 2016/0248511 A1    Aug. 25, 2016

Related U.S. Application Data

(63) Continuation of application No. PCT/CN2014/079389, filed on Jun. 6, 2014.

(51) Int. Cl.
*H04B 10/25* (2013.01)
*H04B 10/27* (2013.01)
(Continued)

(52) U.S. Cl.
CPC ......... *H04B 10/27* (2013.01); *H04L 12/4633* (2013.01); *H04L 41/0226* (2013.01);
(Continued)

(58) Field of Classification Search
CPC ... H04L 12/4633; H04L 45/00; H04L 45/586; H04L 41/0803
(Continued)

(56) References Cited

U.S. PATENT DOCUMENTS

| | | | |
|---|---|---|---|
| 2012/0300615 A1* | 11/2012 | Kempf | H04W 24/02 370/216 |
| 2013/0058208 A1* | 3/2013 | Pfaff | H04L 12/4633 370/217 |

(Continued)

FOREIGN PATENT DOCUMENTS

| | | |
|---|---|---|
| CN | 102171993 A | 8/2011 |
| CN | 103051629 A | 4/2013 |

(Continued)

OTHER PUBLICATIONS

Nick McKeown, et al., "OpenFlow: Enabling Innovation in Campus Networks", Mar. 14, 2008, 6 pages.
(Continued)

*Primary Examiner* — Don N Vo

(57) ABSTRACT

The present invention provides a method for information exchange in an access network, an apparatus, and a system, and relates to the communications field. The method includes: receiving, by an access device, a configuration command from a network management server; converting the configuration command into an OpenFlow-protocol-based openflow message; and sending the openflow message to a terminal device, so that the terminal device configures an openflow flow table according to the openflow message.

16 Claims, 3 Drawing Sheets

(51) Int. Cl.
  *H04L 12/24* (2006.01)
  *H04L 12/46* (2006.01)
  *H04L 12/741* (2013.01)
  *H04L 29/06* (2006.01)

(52) U.S. Cl.
  CPC .......... *H04L 41/0803* (2013.01); *H04L 45/74* (2013.01); *H04L 69/22* (2013.01)

(58) Field of Classification Search
  USPC .......................................................... 398/58
  See application file for complete search history.

(56) References Cited

U.S. PATENT DOCUMENTS

| | | |
|---|---|---|
| 2013/0148667 A1 | 6/2013 | Hama et al. |
| 2013/0287026 A1* | 10/2013 | Davie ................... H04L 45/74 370/392 |
| 2013/0326045 A1 | 12/2013 | Wang et al. |
| 2015/0188812 A1 | 7/2015 | Zheng |
| 2017/0163532 A1* | 6/2017 | Tubaltsev ............... H04L 45/74 |

FOREIGN PATENT DOCUMENTS

| | | |
|---|---|---|
| CN | 103209121 A | 7/2013 |
| CN | 103327529 A | 9/2013 |
| CN | 103686466 A | 3/2014 |
| EP | 2 765 751 A1 | 8/2014 |
| EP | 2 887 691 A1 | 6/2015 |
| WO | WO 2012/023604 A1 | 2/2012 |
| WO | WO 2012/144194 A1 | 10/2012 |
| WO | WO 2013/192011 A2 | 12/2013 |
| WO | WO 2014/040551 A1 | 3/2014 |
| WO | WO 2015/027405 A1 | 3/2015 |

OTHER PUBLICATIONS

J. Case, et al., "A Simple Network Management Protocol (SNMP)", Network Working Group, May 1990, 36 pages.

"CPE WAN Management Protocol", DSLHome-Technical Working Group, May 2004, 109 pages.

* cited by examiner

METHOD FOR INFORMATION EXCHANGE IN ACCESS NETWORK, APPARATUS, AND SYSTEM

CROSS REFERENCE TO RELATED APPLICATIONS

This application is a continuation of International Application No. PCT/CN2014/079389, filed on Jun. 6, 2014, which is hereby incorporated by reference in its entirety.

TECHNICAL FIELD

The present invention relates to the communications field, and in particular, to a method for information exchange in an access network, an apparatus, and a system.

BACKGROUND

A PON (Passive Optical Network) refers to an optical distribution network that does not include any electronic components or electronic power source and is formed only by passive components such as optical splitters. A passive optical network includes an optical line terminal (OLT) installed in a central control station and a set of auxiliary FFTx (Fiber to the x) devices installed at a user site. Specifically, the FFTx devices may include ONUs (Optical Network Units) or ONTs (Optical network terminals).

In an existing PON network, an OLT and an FTTx device each have an independent forwarding entry and run independent software, for example, the OLT may manage the FTTx device by using an OMCI (ONT Management and Control Interface) message, and the FTTx device may also provide an independent IP for a network management system to perform management. The forwarding entries of the OLT and the FTTx device are defined before version release, and a forwarding entry cannot be dynamically added or deleted. In addition, a protocol stack of an FTTx network protocol also runs in the FTTx device and cannot be modified. Therefore, when a new FTTx feature needs to be added or a new feature needs to be modified, the FTTx device needs to be upgraded. However, there are a large number of FTTx devices in a network, and upgrading the large number of FTTx devices bring heavy workload.

The problem in the PON also exists in an access network of another type.

A software defined network (SDN) is a new network innovation architecture in which a core technology openflow implements flexible network traffic control by separating a control plane of a network device and a data plane of the network device, thereby providing an excel lent platform for core network and application innovation.

Based on the foregoing advantage of the SDN network, a traditional access network may evolve into an SDN network. However, deployment of the SDN still brings some problems, for example, when an existing traditional network is switched to an SDN network architecture, an operator needs to deploy a controller, and network operation and maintenance personnel need to learn skills about the SDN network, which require great manpower and investment.

SUMMARY

Embodiments of the present invention provide a method for information exchange in an access network, an apparatus, and a system, so as to enable an existing access network to smoothly evolve into an SDN architecture.

To achieve the foregoing objective, the following technical solutions are used in the embodiments of the present invention:

An embodiment of the present invention provides a method for information exchange in an access network, comprising:

receiving, by an access device, a configuration command from a network management server, wherein the configuration command carries configuration information for instructing a terminal device to process a packet;

converting, by the access device, the configuration command into an OpenFlow-protocol-based openflow message, converting the configuration information into a first flow entry, adding the flow entry to the openflow message; and sending, by the access device, the openflow message to the terminal device, the open flow message carrying the flow entry.

In an implementation manner, the method further comprises: determining, by the access device, according to identification information in registration information from the terminal device, whether the terminal device supports the OpenFlow protocol, wherein the identification information indicates whether the terminal device supports the OpenFlow protocol. In an implementation manner, the method further comprises: delivering, by the access device, a first openflow flow table creation command to the terminal device, so that the terminal device creates an openflow flow table.

In an implementation manner, wherein the converted openflow message is a second openflow flow table creation command, and the second openflow flow table creation command carries the firstflow entry; or the converted openflow message is a first flow entry creation command, and the first flow entry creation command carries the first flow entry.

In an implementation manner, sending, by the access device, a second flow entry to the terminal device to instruct the terminal device to send, when no matching flow entry is found, a packet to a controller for processing, or instruct the terminal device to forward an unidentifiable protocol packet to the controller for processing, wherein the second flow entry is carried in the first openflow flow table creation command, or is carried in the first flow entry creation command, or is carried in the second openflow flow table creation command, or is carried in a second flow entry creation command.

In an implementation manner, wherein the method further comprises:

receiving, by the access device, a packet sent by the terminal device; and when it is determined that a destination address of the packet sent by the terminal device is an address of the access device, parsing the packet sent by the terminal device, determining a flow entry for processing the packet sent by the terminal device, and sending the determined flow entry to the terminal device; or when it is determined that a destination address of the packet is not an address of the access device, matching a flow entry in the access device to obtain an operation set, and processing the packet according to the obtained operation set.

In an implementation manner, wherein the method further comprises:

receiving, by the access device from the terminal device, a network protocol packet carrying set identification information;

parsing, by the access device, the network protocol packet, and encapsulating the parsed network protocol packet into the OpenFlow protocol to generate an OpenFlow protocol packet; and sending, by the access device, the OpenFlow protocol packet to the terminal device, so that the terminal device processes the OpenFlow protocol packet.

In an implementation manner, the sending, by the access device, the openflow message to the terminal device may specifically comprises:

when the access network is a passive optical network, sending, by the access device, the openflow message to the terminal device by using the management and control interface OMCI protocol or the operation, administration and maintenance OAM protocol;

when the access network is a digital subscriber line network, sending, by the access device, the openflow message to the terminal device by using the Point-to-Point PPP Protocol; and when the access network is a wireless network, sending, by the access device, the openflow message to the terminal device by using a 3GPP protocol or a 3GPP2 protocol.

An embodiment of the present invention provides an access device, comprising:

a first transceiver, configured to receive a configuration command from a network management server, where the configuration command carries packet processing configuration information of a terminal device;

a processor, configured to convert the configuration command into an OpenFlow-protocol-based openflow message, convert the configuration information into a flow entry, add the flow entry to the openflow message; and a second transceiver, configured to send the openflow message to the terminal device, the openflow message carrying the flow entry.

In an implementation manner, wherein the second transceiver is further configured to receive registration information of the terminal device, wherein the registration information carries identification information indicating whether the terminal device supports the OpenFlow protocol; and the processor is further configured to deliver a first openflow flow table creation command after determining, according to the identification information, that the terminal device supports the OpenFlow protocol.

In an implementation manner, wherein the processor is further configured to: after determining, according to the identification information, that the terminal device does not support the OpenFlow protocol, send the configuration command to the terminal device that does not support the OpenFlow protocol.

In an implementation manner, the processor is specifically configured to convert the configuration command into a second openflow flow table creation command that is based on the OpenFlow protocol, and add the configuration information in the configuration command to the second openflow flow table creation command in a flow entry form.

In another implementation manner, the processor is specifically configured to convert the configuration command into a flow entry creation command that is based on the OpenFlow protocol, and add the configuration information in the configuration command to the flow entry creation command in a flow entry form.

In an implementation manner, the transceiver is further configured to receive a packet sent by the terminal device, where a destination address of the packet is an address of the access device; and the processor is further configured to parse the packet whose destination address is the address of the access device, determine a flow entry for processing the packet whose destination address is the address of the access device, and send the determined flow entry to the terminal device through the second transceiver.

In another implementation manner, the transceiver is further configured to receive, from the terminal device, a network protocol packet carrying set identification information; and the processor is further configured to parse the network protocol packet in a protocol stack, encapsulate the pared network protocol packet into the OpenFlow protocol to generate an OpenFlow protocol packet, and send the OpenFlow protocol packet to the terminal device through the second transceiver.

An embodiment of the present invention provides an access network system, where the access network system comprises an access device and a terminal device connected to the access device, where the access device is configured to: receive a configuration command from a network management server, where the configuration command carries packet processing configuration information of the terminal device, convert the configuration information into a flow entry, and add the flow entry to the openflow message; convert the configuration command into an OpenFlow-protocol-based openflow message, and send the openflow message to the terminal device, wherein the openflow message carrying the flow entry.

In an implementation manner, the access device is further configured to receive a packet sent by the terminal device, and if a destination address of the packet sent by the terminal device is an address of the access device, parse the packet sent by the terminal device, and send the determined flow entry to the terminal device.

In an implementation manner, the access device is further configured to receive from the terminal device a network protocol packet carrying set identification information, parse the network protocol packet in a protocol stack, encapsulate the parsed network protocol packet into the OpenFlow protocol to generate an OpenFlow protocol packet; and send the OpenFlow protocol packet to the terminal device.

The embodiments of the present invention provide a method for information exchange in an access network, an apparatus, and a system. By implementing control over a terminal device by an access device, a control plane is separated from a data plane in an access network. The solution can realize smooth evolution from an existing access network into an SDN architecture, which reduces maintenance costs of a terminal device while achieving compatibility with an existing network management system.

BRIEF DESCRIPTION OF THE DRAWINGS

To describe the technical solutions in the embodiments of the present invention or in the prior art more clearly, the following briefly introduces the accompanying drawings required for describing the embodiments or the prior art.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention.

In the embodiments of the present invention, to achieve smooth evolution from an existing access network to an SDN network, an access device in the access network may be used as a controller of a terminal device, and the access device delivers configuration information to the terminal device, so as to control packet forwarding of the terminal device, thereby implementing separation of a control plane from a data plane in the access network.

The following describes several access network architectures separately.

Figure 1:
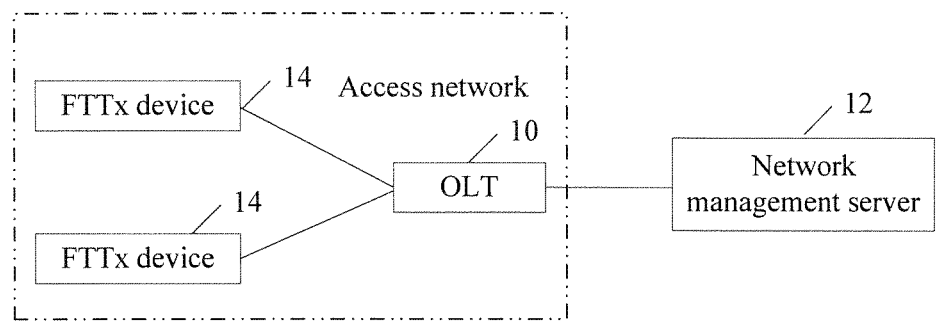
FIG. 1 is a schematic structural diagram of a PON network according to an embodiment of the present invention.

FIG. 1 is a schematic structural diagram of an applicable PON network according to an embodiment of the present invention.

In FIG. 1, an OLT 10 may be connected to one or more FTTx devices 14, the OLT 10 and the FTTx device 14 are connected by using an optical fiber, and the FTTx device 14 may be an ONU or an ONT. When the FTTx device is located in a passageway, the OLT 10 and the FTTx device 14 form FTTB; when the FTTx device 14 is located in a user's house, the OLT 10 and the FTTx device 14 form FTTH; when the FTTx device 14 is located in a street, the OLT 10 and the FTTx device 14 form FTTC. An architecture formed by the OLT 10 and the FTTx device 14 varies with different locations of the FTTx device 14 and is not exhaustively described herein.

In FIG. 1, the terminal device 14 may be controlled by the OLT 10 to realize a data forwarding function.

Figure 2:
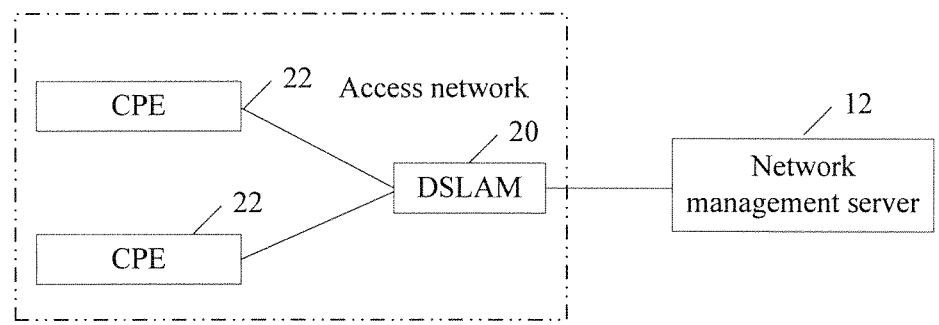
FIG. 2 is a schematic structural diagram of a DSL network according to an embodiment of the present invention.

FIG. 2 is a schematic structural diagram of an applicable DSL network according to an embodiment of the present invention.

In FIG. 2, a DSLAM (Digital Subscriber Line Access Multiplexer, digital subscriber line access multiplexer) 20 is connected to a network management server 12 on a network side, and may be connected to one or more CPEs (Customer Premises Equipment, customer premises equipment) 22 on a user side, where the DSLAM 20 and the CPE 22 are connected by using a DSL (Digital Subscriber Line), and the CPE may be a DSL modem, or the like.

In FIG. 2, the terminal device CPE 22 may be controlled by the DSLAM 20 to implement a data forwarding function.

Figure 3:
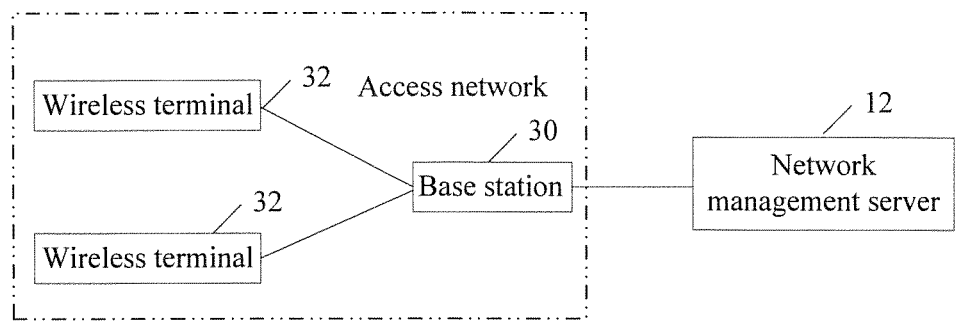
FIG. 3 is a schematic structural diagram of a radio access network according to an embodiment of the present invention.

FIG. 3 is a schematic structural diagram of an applicable wireless network according to an embodiment of the present invention.

In FIG. 3, a base station 30 is connected to a network management server 12 on a network side, and may be connected to one or more wireless terminals 32 on a user side, where the base station 30 and the wireless terminal 32 may be connected by using a wireless network, and the wireless network includes but is not limited to WCDMA, WLAN, CDMA, GPRS, and the like. The wireless terminal may be a wireless router, a wireless modem, a mobile station, or the like.

In FIG. 3, the wireless terminal 32 may be controlled by the base station 30 to implement a data forwarding function.

To achieve evolution from an access network into an SDN, an access device may serve as a controller of a terminal device, interaction between the access device and the terminal device may be performed by using the OpenFlow protocol, and the terminal device implements data forwarding under control of the access device. The access device herein may be the OLT in FIG. 1, the DSLAM in FIG. 2, the base station in FIG. 3, or the like; correspondingly, the terminal device may be the FTTx device in FIG. 1, the CPE in FIG. 2, the wireless terminal in FIG. 3, or the like.

The access device may deliver an openflow flow table creation command to the terminal device by using the OpenFlow protocol, and may further deliver a packet processing flow entry to the terminal device by using the OpenFlow protocol.

The access device may deliver an openflow flow table creation command and/or a flow entry creation command or the like to a connected terminal device. For a terminal device that supports the OpenFlow protocol, an openflow flow table may be created according to the openflow flow table creation command, and a received flow entry is stored in the created openflow flow table, where the flow entry may be used to process a received packet subsequently; for a terminal device that does not support the OpenFlow protocol, an OpenFlow-protocol-based message may be discarded, and a traditional procedure may be used to process a received packet subsequently.

The access device may also interact, by using the OpenFlow protocol, with a terminal device after receiving a registration message of the terminal device and determining, according to identification information in the registration message, that the terminal device supports the OpenFlow protocol. The identification information may have multiple implementation manners. In an optional implementation manner, the registration message of the terminal device may carry model information of the terminal device, where the model information includes a device type of the terminal device, such as FTTB and FTTC; a type of a device supporting the OpenFlow protocol may be pre-stored in the access device; after receiving the registration message of the terminal device, the access device may determine, according to the device type in the registration message, whether the terminal device supports the OpenFlow protocol. In another optional implementation manner, the terminal device may also add an identifier bit to the registration message to indicate whether the terminal device supports the OpenFlow protocol, and the access device determines, according to a value of the identifier bit, whether the terminal device supports the OpenFlow protocol, or the like.

If determining that the terminal device sending the registration message supports the OpenFlow protocol, the access device may interact with the terminal device by using the OpenFlow protocol, including delivering an openflow flow table creation command, a flow entry creation command, and the like; if determining that the terminal device does not support the openflow message, the access device performs processing according to an existing procedure. A person skilled in the art should be familiar with existing packet processing procedures in different access networks, and details are not repeated herein.

In addition, whether a terminal device supports the OpenFlow protocol may also be statically configured in the access device, for example, a device identifier indicating that a terminal device supports the OpenFlow protocol is preconfigured. The access device may interact, by using the OpenFlow protocol, with the terminal device that supports the OpenFlow protocol; the access device may interact, in an existing manner, with a terminal device that does not support the OpenFlow protocol.

In an optional implementation manner, after instructing the terminal device to create an openflow flow table, the access device may further deliver a default flow entry to the terminal device, for example, delivering a flow entry instructing the terminal device to send, when no matching flow entry is found, a packet to a controller for processing, or delivering a flow entry instructing the terminal device to forward an unidentifiable protocol packet to the controller for processing. The default flow entry may be carried in an openflow flow table creation command, or may be carried in a flow entry creation command.

In this embodiment, the access device may receive a configuration command that is delivered by a network management server to the terminal device, where the delivered configuration command may carry packet processing configuration information of the terminal device. A protocol used by the configuration command may be the SNMP protocol or the TR069 protocol, or the like, or may be in a command-line form, or the like. This embodiment does not limit a specific protocol or a specific form of the configuration command. In this embodiment of the present invention, the access device may convert the received configuration command into an OpenFlow-protocol-based message, and send the OpenFlow-protocol-based message to the terminal device. The terminal device may store the configuration information carried in the OpenFlow-protocol-based message into an openflow flow table in a flow entry form.

For some access networks employing hybrid networking, hybrid networking herein means that some terminal devices support the OpenFlow protocol and some terminal devices do not support the OpenFlow protocol. To ensure that a service of a terminal device that does not support the OpenFlow protocol is not affected, the access device may transparently transmit the configuration command of the network management server to terminal devices while sending the converted OpenFlow-protocol-based message to the terminal devices. In this case, a terminal device that supports the OpenFlow protocol may process the OpenFlow-protocol-based message, and the terminal device that does not support the OpenFlow protocol may use a traditional manner to process the configuration command of the network management server. Certainly, the access device may also convert the configuration command after determining that the terminal device supports the OpenFlow protocol, and send the OpenFlow-protocol-based message to the terminal device; for the terminal device that does not support the OpenFlow protocol, the access device directly transparently transmits the configuration command of the network management server to the terminal device. Whether a terminal device supports the OpenFlow protocol may be determined according to preconfigured information, such as a type of a device supporting the OpenFlow protocol, or may be learned from a registration message of the terminal device. A specific determining manner has been described above. There may be another implementation manner in which a protocol used for interacting with a terminal device is determined, that is, the access device converts the configuration command into the OpenFlow-protocol-based message and sends the OpenFlow-protocol-based message to a terminal device; a terminal device that does not support the OpenFlow protocol may discard the OpenFlow-protocol-based message, and request configuration information from the access device subsequently when the configuration information is not found.

The OpenFlow-protocol-based message converted by the access device may be an openflow flow table creation command, a flow entry creation command, or the like. If the OpenFlow-protocol-based message is an openflow flow table creation command, the configuration information may be carried in the openflow flow table creation command in a flow entry form; if the OpenFlow-protocol-based message is a flow entry creation command, the configuration information may be carried as a specific flow entry in the flow entry creation command.

To reduce modifications to an existing access network architecture as far as possible, the access device may bear the OpenFlow protocol by using some existing protocols. For the PON network in FIG. 1, the OLT 10 may bear the OpenFlow protocol by using the OMCI (ONU Management and Control Interface) protocol or the OAM (Operation, Administration and Maintenance) protocol, so as to implement interaction with the FTTx device 14; for the DSL network in FIG. 2, the DSLAM 20 may bear the OpenFlow protocol by using the PPP (Point-to-Point, point-to-point) protocol; for the wireless network architecture shown in FIG. 3, the base station 30 may bear the OpenFlow protocol by using a protocol such as 3GPP and 3GPP2.

In this embodiment of the present invention, after receiving a packet, if no matching flow entry is found in a local openflow flow table, the terminal device forwards the packet to the controller, namely the access device. Because the access device itself may serve as a forwarding device, the access device may determine, according to a destination address in the packet, whether the packet is sent to the access device or needs to be forwarded by the access device; if the destination address in the packet is an address of the access device, the access device parses the packet, determines a flow entry for processing the packet, and sends the flow entry to the terminal device; if the destination address in the packet is not the address of the access device, the access device performs flow entry matching in the access device to obtain an operation set, and processes the packet according to the obtained operation set. If no flow entry is set in the access device, the access device may process the received packet according to a traditional procedure. The access device may determine, according to whether the destination address of the packet is a MAC (Media Access Control) address or an IP address of the access device, whether the packet is sent to the access device.

In an optional implementation manner, after parsing the packet, the access device may send the received packet and the determined flow entry to the terminal device, and the terminal device may use the determined flow entry to process the packet.

In this embodiment of the present invention, the terminal device may further receive an unidentifiable network protocol packet. The terminal device may add set identification information to such a packet and send the packet to the access device; the access device may parse the packet, encapsulate the parsed network protocol packet into the OpenFlow protocol to generate an OpenFlow protocol packet, and send the OpenFlow protocol packet to the terminal device. The terminal device may process the received OpenFlow protocol packet according to the OpenFlow protocol.

An access network system provided in an embodiment implements separation of a control plane from a data plane in an existing access network, where an access device is used as a controller, and a terminal device is used as a data forwarding device; the access device converts another protocol on a network side into the OpenFlow protocol, so that the access device and the terminal device interact with each other by using the OpenFlow protocol, thereby achieving a purpose of smooth evolution from the existing access network into an SDN network.

Figure 4:
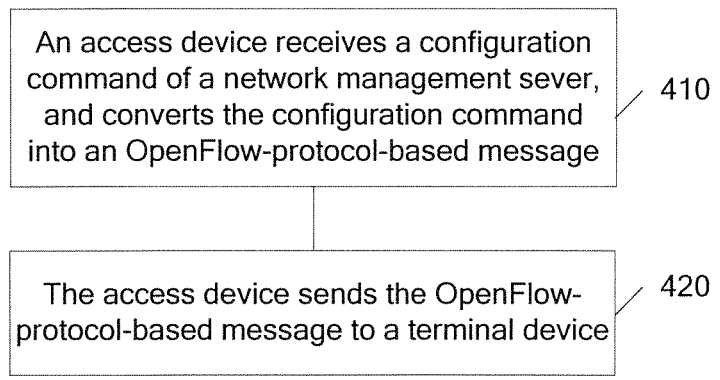
FIG. 4 is a flowchart of a method for information exchange in an access network according to an embodiment of the present invention.

FIG. 4 is an information exchange method according to an embodiment of the present invention, and the provided information exchange method may be applied to the access networks shown in FIG. 1 to FIG. 3.

As shown in FIG. 4, the provided method includes:

Step 410. An access device receives a configuration command of a network management server, and converts the configuration command into an OpenFlow-protocol-based message Step 420. The access device sends the OpenFlow-protocol-based message to a terminal device.

Before step 410, the access device may further send an openflow flow table creation command to a connected terminal device.

The access device may be connected to multiple terminal devices, where all or only some of these terminal devices may support the OpenFlow protocol. To store a packet processing flow entry in a terminal that supports the OpenFlow protocol, the access device may send the openflow flow table creation command to all connected terminal devices in a centralized manner where the sent openflow flow table creation command carries an openflow identifier, such as an index and a name, and may further carry specification information of an openflow flow table, such as storage space and/or CPU usage. After receiving the openflow flow table creation command, a terminal device that supports the OpenFlow protocol creates the openflow flow table according to the openflow flow table creation command.

The access device may also send the openflow flow table creation command to the terminal device after receiving a registration message of the terminal device and determining, according to model information or a set identifier bit in the registration message, that the terminal device supports the OpenFlow protocol.

The access device may further deliver a default flow entry to the terminal device, and the terminal device may store the received default flow entry into a created openflow flow table. The default flow entry may be used to instruct the terminal device to send, when no matching flow table is found or an unidentifiable network protocol packet is received, the packet to the access device for processing.

The default flow entry may be carried in the openflow flow table creation command and delivered to the terminal device. The default flow entry may also be delivered to the terminal device in a flow entry creation command form; in this case, in addition to carrying the default flow entry, the flow entry creation command may carry information such as an identifier of an openflow flow table to which the default flow entry is prestored, so that after receiving the flow entry creation command, the terminal device stores the default flow entry into an openflow flow table specified in the flow entry creation command.

For example, the access device may deliver one default flow entry to the terminal device to instruct the terminal device to report, when a network protocol packet cannot be identified or no matching flow entry is found, the packet to the access device. The access device may deliver one flow entry to the terminal device, and the terminal device adds the flow entry to the openflow flow table, as shown in Table 1.

TABLE 1

| openflow Table 1 | |
| --- | --- |
| Table miss | Action: Send to Controller |

The flow entry may be carried in the openflow flow table creation command delivered by the access device, so as to instruct the terminal device to create the foregoing default flow entry in the openflow Table 1 while creating the openflow Table 1. The flow entry may also be delivered to the terminal device in a flow entry creation command form, so as to instruct the terminal device to add the foregoing flow entry to the openflow Table 1.

In step 410, the configuration command of the network management server may be based on the SNMP protocol, the TR069 protocol, or the like, or may be a configuration command line, or the like, where the configuration command carries packet processing configuration information of the terminal device.

After receiving the configuration command, the access device converts the configuration command into an OpenFlow-protocol-based message, and adds the configuration information in the configuration command to the OpenFlow-protocol-based message in a flow entry form.

For example, when the configuration command delivered by the network management server to the terminal device is based on the SNMP protocol, if the configuration command carries one piece of configuration information to instruct the terminal device to add VLAN 10 to a packet received by port 0, the SNMP protocol packet carrying the piece of configuration information may be shown in Table 2.

TABLE 2

| SNMP header | OID: 1.3.6.2.13.1.1 | Value: 0 | OID: 1.3.6.2.13.1.2 | Value: 10 |
| --- | --- | --- | --- | --- |

If the configuration command of the network management server uses the TR069 protocol, a TR069 protocol packet carrying the piece of configuration information for adding VLAN 10 to the packet received by port 0 may be as follows:

```
<soapenv:Body>
  <cwmp:setparametervalues>
    <parameterlist          soap:array
type="cwmp:parametervaluestruct[2]">
      <parametervaluestruct>
        <name>internetgatewaydevice.WANdevice.1.
WANconnectiondevice.3.X_CT-COM_Port.portid</name>
        <value xsi:type="xsd:unsignedint">0</value>
      </parametervaluestruct>
      < parametervaluestruct>
        <              name              >
internetgatewaydevice.WANdevice.1.WANconnectiondevice.3.
X_CT-COM_VLAN.Vlanid</name>
        <value xsi:type="xsd:unsignedint">10</value>
      </parametervaluestruct>
    </parameterlist>
    <parameterkey>63103787</parameterkey>
  </cwmp:setparametervalues>
</soapenv:Body>
```

An example of a command line form is not provided herein, which should be known by a person skilled in the art.

After receiving this configuration command, the access device converts this configuration command into an OpenFlow-protocol-based message, for example, an openflow flow table creation command or a flow entry creation command, and adds, to the OpenFlow-protocol-based message and in a flow entry form, the piece of configuration information for adding VLAN 10 to the packet received by port 0, as shown in Table 3.

TABLE 3

| Match condition: | Action: |
|---|---|
| sport = uni 0 | Add VLAN 10; Send to UNI port 3 |

If there are multiple openflow flow tables in the terminal device, the access device may further add, to the OpenFlow-protocol-based message, identification information of an openflow flow table to which the flow entry is prestored, for example, the openflow Table 1 shown in Table 1.

In step 420, to reduce modifications to an existing access network as far as possible, the access device may bear the OpenFlow protocol by using a protocol of the existing access network. Specifically, for a PON network, the access device may bear the OpenFlow protocol by using the OMCI protocol or the OAM protocol, and send the converted OpenFlow-protocol-based message to an FTTx device; for a DSL network, the access device may bear the OpenFlow protocol by using the PPP protocol, and send an OpenFlow protocol message carried in the PPP protocol to a CPE for a wireless network, the access device may bear the OpenFlow protocol by using a protocol such as 3GPP and 3GPP2.

A specific bearing manner may be that the OpenFlow protocol message is carried in a payload or a newly-added field of protocols such as the OMCI protocol, the OAM protocol, the PPP protocol, a 3GPP protocol, a 3GPP2 protocol, or in another set field. A person skilled in the art should know about how to carry the OpenFlow protocol message in these fields.

After receiving the foregoing OpenFlow-protocol-based message, the terminal device stores the flow entry in the message into an openflow flow table. Specifically, if there is only one openflow flow table in the terminal device, the flow entry is stored in this openflow flow table; if there are multiple openflow flow tables in the terminal device, the foregoing flow entry is stored in an openflow flow table specified in the OpenFlow-protocol-based message, as shown in Table 4.

TABLE 4

| openflow Table1 | |
|---|---|
| Match condition: | Action: |
| sport = uni 0 | Add VLAN 10; Send to UNI port 3 |

After receiving a packet subsequently, the terminal device may query the openflow flow table, and match information in the packet with a flow entry in the openflow flow table, so as to obtain an operation set and process the received packet according to the operation set.

In an embodiment of the present invention, the terminal device may send, to the access device, a packet that cannot be processed (for ease of description, this type of packet is called the first packet in the embodiment of the present invention). After receiving the first packet sent by the terminal device, if learning that a destination address of the first packet is an address of the access device, such as an IP address or a MAC address, the access device parses the packet, so as to determine a flow entry for processing the first packet, and sends the flow entry for processing the first packet to the terminal device. In an optional manner, the access device may further send the first packet back to the terminal device. After receiving the flow entry for processing the first packet, the terminal device may use the flow entry to process the first packet.

In another embodiment of the present invention, the terminal device may receive an unidentifiable network protocol packet; for this type of packet, the terminal device adds set identification information to the unidentifiable network protocol packet, and then sends the packet to the access device. If determining that the received network protocol packet carries the set identification information, the access device uses a protocol stack set by the access device to parse the network protocol packet, encapsulates the parsed network protocol packet into the OpenFlow protocol, and sends a generated OpenFlow protocol message to the terminal device. After receiving the OpenFlow protocol message, the terminal device uses the OpenFlow protocol to process the network protocol packet.

According to the exchange method provided by this embodiment, an access device serves as a controller of a terminal device in an access network, and delivers packet processing configuration information to the terminal device by converting a configuration command of a network management server into an OpenFlow-protocol-based openflow message, thereby implementing separation of a control plane from a data plane in the access network with small modifications to the existing access network, and further implementing smooth evolution from the access network into an SDN network.

Figure 5:
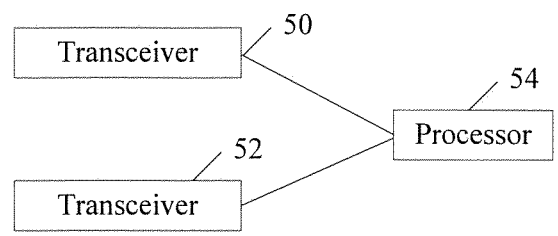
FIG. 5 is a schematic structural diagram 1 of an access device according to an embodiment of the present invention.

An embodiment of the present invention provides an access device. As shown in FIG. 5, the access device may be connected to a network management device (not shown in the figure) and one or more terminal devices (not shown in the figure), where the provided access device includes a transceiver 50, a transceiver 52, and a processor 54. The transceiver 50 and the transceiver 52 are separately connected to the processor 54. A person skilled in the art should know that the transceiver 50 and the transceiver 52 may also be one transceiver.

In an implementation manner, the access device may be an OLT, and then the transceiver 50 and the transceiver 52 may be optical modules, and the processor 54 may be a forwarding chip and the like. In another implementation manner, the access device may further be a DSLAM, and then the transceivers 50 and 52 may be joint transceivers disposed in the DSLAM, and the processor 54 may be a forwarding chip and the like; the access device may further be a base station, and then the transceivers 50 and 52 may be rake transceivers disposed in the base station.

The transceiver 50 is configured to receive a configuration command from a network management server, where the configuration command carries packet processing configuration information of a terminal device.

The processor 54 is configured to convert the configuration command into an OpenFlow-protocol-based openflow message, convert the configuration information into a flow entry, and add the flow entry to the openflow message.

The transceiver 52 is configured to send, to the terminal device, the openflow message carrying the flow entry.

The configuration command received by the transceiver 50 from the network management server may be based on the SNMP protocol or the TR069 protocol, or may be a command line, or the like. How the processor 54 converts configuration commands of different protocols into Open-Flow-protocol-based messages has been described in the foregoing method embodiments, and details are not described herein again.

The transceiver 52, connected to the terminal device on a user side, may receive a registration message of the terminal device, and may deliver an openflow flow table creation command, a flow entry creation command, and the like to the terminal device.

The processor 54 may determine, according to model information or a preset identifier bit in the registration message, whether the terminal device supports the Open-Flow protocol, and determine a forwarding procedure used by the terminal device, such as an OpenFlow protocol forwarding procedure or a traditional forwarding procedure; and may store a correspondence between the forwarding procedure and the protocol into a memory (not shown in the figure) of the access device, for example, a correspondence between the OpenFlow protocol and the openflow forwarding procedure is supported, and a correspondence between the OpenFlow protocol and the traditional forwarding procedure is not supported, and a specific form is not limited thereto.

The processor 54 may further generate an openflow flow table creation command, determine a default flow entry, and send the generated openflow flow table creation command and the default flow entry to the terminal device through the transceiver 52, so that the terminal device stores the flow entry into a created openflow flow table.

An OpenFlow protocol message between the transceiver 52 and the terminal device may be carried in some existing protocols of an access network. For example, for a PON network, the OMCI protocol or the OAM protocol may be used to carry the OpenFlow protocol message, and a converted OpenFlow-protocol-based message is sent to an FTTx device; for a DSL network, the PPP protocol may be used to carry the OpenFlow protocol message; for a wireless network, a protocol, such as 3GPP and 3GPP2, may be used to carry the OpenFlow protocol message.

In an embodiment, the transceiver 52 may further receive the first packet sent by the terminal device; after determining that a destination address of the first packet is an address of the access device, the processor 54 parses the first packet, so as to determine a flow entry for processing the first packet; the transceiver 52 sends the flow entry for processing the first packet to the terminal device by using the OpenFlow protocol.

In another embodiment, the transceiver 52 may further receive an unidentifiable network protocol packet that is forwarded by the terminal device; after determining that the received network protocol packet carries set identification information, the processor 54 uses a protocol stack set by the processor 54 to parse the received network protocol packet, encapsulate the parsed network protocol packet into the OpenFlow protocol, and send the packet to the terminal device through the transceiver 52.

Figure 6:
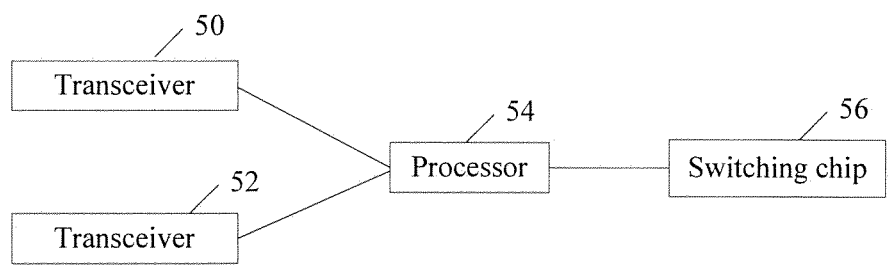
FIG. 6 is a schematic structural diagram 2 of an access device according to an embodiment of the present invention.

The access device provided by this embodiment of the present invention may further include a switching chip. As shown in FIG. 6, a switching chip 56 is configured to perform switching processing on a packet between the transceiver 50 and the transceiver 52.

In another implementation manner, the access device provided by this embodiment may further be implemented by a processor and a memory, where the memory may be disposed inside the processor, or may be disposed independently of the processor. The memory and the processor may be connected by using one or multiple buses. The processor may be a CPU, a microprocessor, another chip having a processing function, or the like; the memory may be a component or module having a storage capability, such as a ROM (Read-Only Memory), a RAM (Random Access Memory), or a FLASH.

Figure 7:
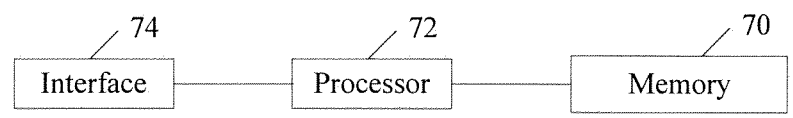
FIG. 7 is a schematic structural diagram 3 of an access device according to an embodiment of the present invention.

As shown in FIG. 7, a memory 70 is configured to store a configuration command delivered by a network management server, where the configuration command carries configuration information sent to a terminal device; and a processor 72 is configured to convert the configuration command in the memory 70 into an OpenFlow-protocol-based openflow message, convert the configuration information into a flow entry, add the flow entry to the openflow message, and send the openflow message to the terminal device, where how the processor 72 converts the configuration command into the openflow message has been described in the foregoing embodiments.

The processor 72 may send the openflow message to the terminal device by using an interface 74 that is on the access device and connected to the terminal device. The interface 74 may be a module on a physical port that is disposed in the access device and is connected to the terminal device, and is configured to send a message of the processor 72 to the terminal device and receive a message of the terminal device.

The processor 72 may be further configured to determine whether the terminal device supports the OpenFlow protocol, and the memory 70 may store a type of a device that supports the OpenFlow protocol. After the interface 74 receives a registration message of the terminal device, the processor 72 may learn a device type of the terminal device from model information in the registration message, so as to determine whether the terminal device supports the OpenFlow protocol. If the terminal device supports the OpenFlow protocol, the OpenFlow protocol is used for interaction with the terminal device; if the terminal device does not support the OpenFlow protocol, an existing traditional protocol is used for interaction with the terminal device. The memory 70 may further set a correspondence between a protocol and an interaction procedure.

The interface 74 may receive the first packet sent by the terminal device; after determining that a destination address of the first packet is an address of the access device, the processor 72 parses the first packet, so as to determine a flow entry for processing the first packet, and send the flow entry for processing the first packet to the terminal device through the interface 74.

The interface 74 may further receive an unidentifiable network protocol packet that is forwarded by the terminal device. After determining that the received network protocol packet carries preset identification information, the processor 72 uses a set protocol stack 76 to parse the received network protocol packet, encapsulates the parsed network protocol packet into the OpenFlow protocol, and sends the packet to the terminal device through the interface 74. The protocol stack 76 may be set inside the processor 72 and work as a module to process and parse various protocols; or may be a module independent of the processor 72 and be connected to the processor 72 by using a bus.

The access device provided by this embodiment may serve as a controller of a terminal device, and deliver packet processing configuration information to the terminal device by converting a configuration command of a network management server into an OpenFlow-protocol-based openflow message, thereby implementing separation of a control plane from a data plane in an access network with small modifications to the existing access network, and further implementing smooth evolution from the access network to an SDN network.

The foregoing descriptions are merely specific implementation manners of the present invention, but are not intended to limit the protection scope of the present invention. Therefore, the protection scope of the present invention shall be subject to the protection scope of the claims.

What is claimed is:

1. A method for information exchange in a passive optical network (PON), the method comprising:
receiving, by an access device, a configuration command from a network management server, wherein the configuration command carries configuration information for instructing a terminal device to process a packet;
converting, by the access device, the configuration command into an OpenFlow message, converting the configuration information into a first flow entry, and adding the flow entry to the openflow message; and
sending, by the access device to the terminal device, the openflow message carrying the flow entry in an optical network unit management and control interface (OMCI) protocol, when determining the terminal device supports the OpenFlow protocol according to identification information in registration information from the terminal device, wherein the identification information indicates whether the terminal device supports the OpenFlow protocol, wherein the openflow message is carried in a payload of the OMCI protocol.

2. The method according to claim 1, further comprising:
delivering, by the access device, a first openflow flow table creation command to the terminal device for creating an openflow flow table.

3. The method according to claim 2, wherein:
the converted openflow message is a second openflow flow table creation command, and the second openflow flow table creation command carries the first flow entry; or
the converted openflow message is a first flow entry creation command, and the first flow entry creation command carries the first flow entry.

4. The method according to claim 3, further comprising:
sending, by the access device, a second flow entry to the terminal device to instruct the terminal device to send, when no matching flow entry is found, a packet to a controller for processing, or instruct the terminal device to forward an unidentifiable protocol packet to the controller for processing, wherein
the second flow entry is carried in the first openflow flow table creation command, or is carried in the first flow entry creation command, or is carried in the second openflow flow table creation command, or is carried in a second flow entry creation command.

5. The method according to claim 1, wherein the method further comprises:
receiving, by the access device, a packet sent by the terminal device;
when it is determined that a destination address of the packet sent by the terminal device is an address of the access device, parsing the packet sent by the terminal device, determining a flow entry for processing the packet sent by the terminal device, and sending the determined flow entry to the terminal device; or
when it is determined that a destination address of the packet is not an address of the access device, matching a flow entry in the access device to obtain an operation set, and processing the packet according to the obtained operation set.

6. The method according to claim 1, wherein the method further comprises:
receiving, by the access device from the terminal device, a network protocol packet carrying set identification information;
parsing, by the access device, the network protocol packet, and encapsulating the parsed network protocol packet into the OpenFlow protocol to generate an OpenFlow protocol packet; and
sending, by the access device, the OpenFlow protocol packet to the terminal device for processing the OpenFlow protocol packet.

7. A passive optical network (PON) device, comprising:
a first transceiver, configured to receive a configuration command from a network management server, wherein the configuration command carries packet processing configuration information of a terminal device;
a processor, configured to convert the configuration command into an OpenFlow-message, convert the configuration information into a flow entry, and add the flow entry to the openflow message; and
a second transceiver, configured to send, to the terminal device, the openflow message carrying the flow entry in an optical network unit management and control interface (OMCI) protocol, when determining the terminal device supports the OpenFlow protocol according to identification information in registration information from the terminal device, wherein the identification information indicates whether the terminal device supports the OpenFlow protocol, wherein the openflow message is carried in a payload of the OMCI protocol.

8. The access PON device according to claim 7, wherein the processor is further configured to:
after determining, according to the identification information, that the terminal device does not support the OpenFlow protocol, send the configuration command to the terminal device that does not support the OpenFlow protocol.

9. The PON device according to claim 7, wherein the processor is configured to convert the configuration command into a second openflow flow table creation command that is based on the OpenFlow protocol, and add the configuration information in the configuration command to the second openflow flow table creation command in a flow entry form.

10. The PON device according to claim 7, wherein the processor is configured to convert the configuration command into a flow entry creation command that is based on the OpenFlow protocol, and add the configuration information in the configuration command to the flow entry creation command in a flow entry form.

11. The PON device according to claim 7, wherein:
the second transceiver is further configured to receive a packet sent by the terminal device, wherein a destination address of the packet is an address of the PON device; and
the processor is further configured to parse the packet whose destination address is the address of the PON device, determine a flow entry for processing the packet whose destination address is the address of the PON device, and send the determined flow entry to the terminal device through the second transceiver.

12. The access PON device according to claim 7, wherein:
the second transceiver is further configured to receive, from the terminal device, a network protocol packet carrying set identification information; and
the processor is further configured to parse the network protocol packet in a protocol stack, encapsulate the pared network protocol packet into the OpenFlow protocol to generate an OpenFlow protocol packet, and send the OpenFlow protocol packet to the terminal device through the second transceiver.

13. The PON device according to claim 7, wherein the PON device is an optical line terminal, a digital subscriber line access multiplexer, or a base station.

14. A passive optical network (PON) system, comprising: a PON device and a terminal device connected to the PON device;
wherein the PON device is configured to:
receive a configuration command from a network management server, wherein the configuration command carries packet processing configuration information of the terminal device,
convert the configuration command into an OpenFlow-protocol-based openflow message,
convert the configuration information into a flow entry, add the flow entry to the openflow message, and
send, to the terminal device, the openflow message carrying the flow entry in an optical network unit management and control interface (OMCI) protocol, when determining the terminal device supports the OpenFlow protocol according to identification information in registration information from the terminal device, wherein the identification information indicates whether the terminal device supports the OpenFlow protocol, wherein the openflow message is carried in a payload of the OMCI protocol; and
wherein the terminal device is configured to store the configuration information in the openflow message into an openflow flow table.

15. The PON system according to claim 14, wherein the PON device is further configured to:
receive a packet sent by the terminal device; and
when a destination address of the packet sent by the terminal device is an address of the PON device, parse the packet sent by the terminal device, determine a flow entry for processing the packet sent by the terminal device, and send the determined flow entry to the terminal device.

16. The PON system according to claim 14, wherein the PON device is further configured to:
receive, from the terminal device, a network protocol packet carrying set identification information;
parse the network protocol packet in a protocol stack;
encapsulate the parsed network protocol packet into the OpenFlow protocol to generate an OpenFlow protocol packet; and
send the OpenFlow protocol packet to the terminal device.

* * * * *